United States Patent [19]

Moore

[11] 4,156,983
[45] Jun. 5, 1979

[54] FISHING LINE TENSIONING DEVICE

[75] Inventor: Harry O. Moore, Charlotte, N.C.

[73] Assignee: William C. Cribbs, Charlotte, N.C.; a part interest

[21] Appl. No.: 868,514

[22] Filed: Jan. 11, 1978

[51] Int. Cl.² ............................................. A01K 87/00
[52] U.S. Cl. ................................................... 43/25
[58] Field of Search ................ 43/25, 44.95, 43.12, 43/42.09

[56] References Cited

U.S. PATENT DOCUMENTS

| 3,581,428 | 6/1971 | Helder ..................................... 43/25 |
| 3,654,722 | 4/1972 | Camilleri ................................ 43/25 |
| 3,927,488 | 12/1975 | Peddy ..................................... 43/25 |
| 4,003,153 | 1/1977 | Khalil ..................................... 43/25 |

*Primary Examiner*—Robert C. Watson
*Attorney, Agent, or Firm*—Bell, Seltzer, Park & Gibson

[57] ABSTRACT

A device adapted for mounting on a fishing rod for tensioning fishing line as the line is being wound onto the reel. The tensioning device comprises a body having a peripheral recess, a fastener for securing the body to a fishing rod, and a resilient wire which is carried by the body and has portions thereof extending within the peripheral recess so that fishing line positioned between the resilient wire and the body is snubbed as it is wound onto the reel.

2 Claims, 5 Drawing Figures

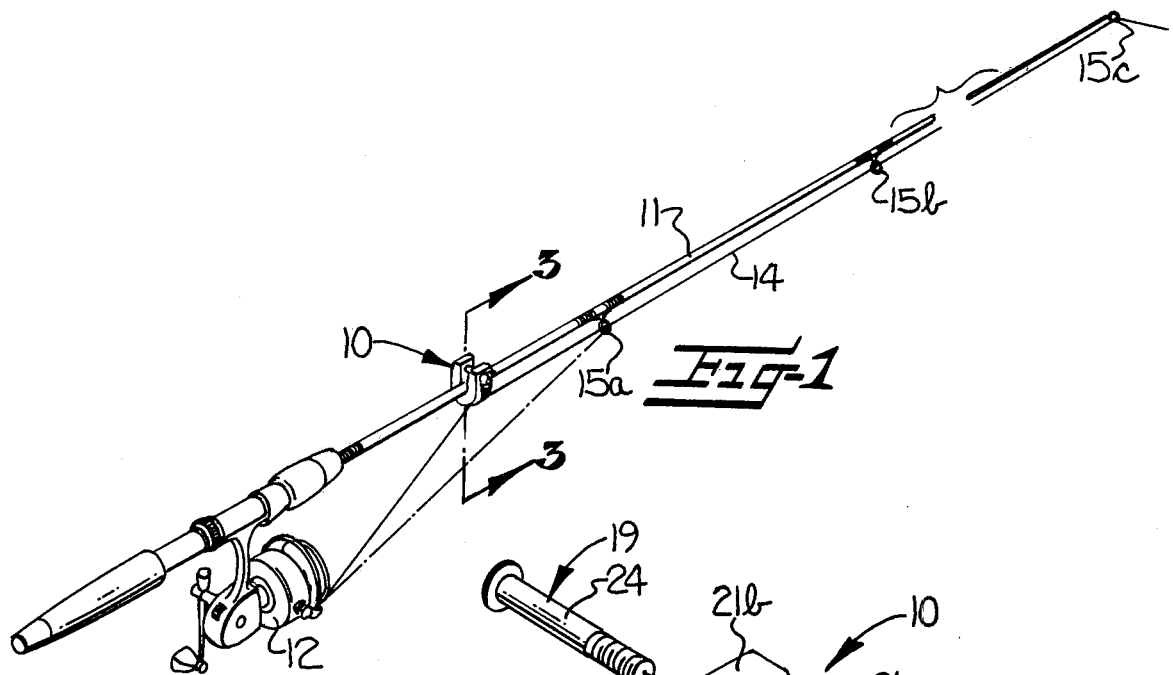
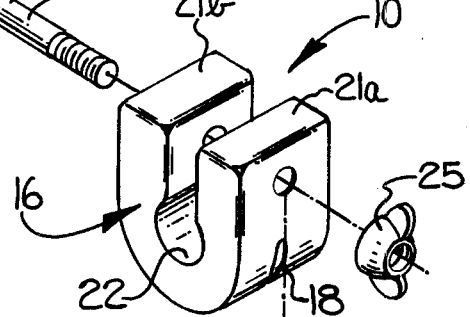
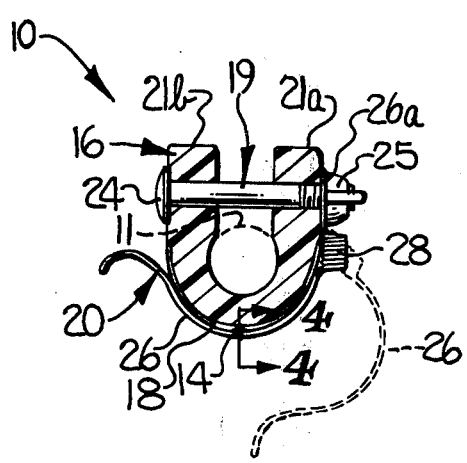
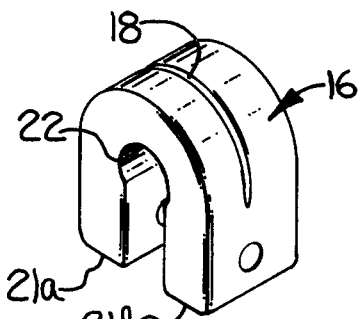
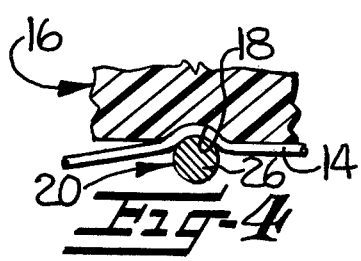

FISHING LINE TENSIONING DEVICE

This invention relates to a fishing line tensioning device adapted to be utilized when fishing line is being wound onto the spool of the fishing reel as a fisherman repeatedly casts and winds in his line. The tension imparted to the fishing line by the device allows for a snug wind on the spool of the reel so as to facilitate better casting by alleviating problems due to snags and tangles in the fishing line. Also, the tensioning device of this invention functions to free the tensioned line when a significant tug or jerk is imparted thereto, typically occurring when a fish takes the lure or bait on the end of the fishing line. By releasing the line when a substantial tug is imparted thereto, the device functions to avoid the likelihood of the fishing line being broken when it is tugged or jerked.

Fishermen heretofore have attempted to solve the problem of snags forming in their fishing line by utilizing mechanical apparatus or their fingers to grip the line as it is wound onto the reel. This gripping or tensioning of the line with the fingers or with previously known mechanical devices was found to be unsatisfactory, however.

The deficiencies in the use of fingers to tension fishing lines are inherent since this remedy is tiresome and imprecise with the results tending to vary from time to time. Also, this technique can result in the fisherman having less control over his rod and reel since at least several fingers of one hand will be utilized in an attempt to tension a fishing line as it is wound onto the reel.

Those mechanical devices disclosed by prior art patents, such as the devices disclosed in U.S. Pat. Nos. 2,700,787, 3,545,119 and 3,769,737 are constructed quite differently than the instant invention and are believed to be inherently deficient in performing the function of the instant invention due to their particular structural makeup.

Other types of gripping devices are known to those skilled in the art of fishing, such as those disclosed in U.S. Pat. Nos. 2,183,445, 2,791,858, 2,843,963, 3,045,380, 3,057,106, 3,069,800, 3,654,722 and 3,782,023. However, these gripping devices are constructed to securely grip the line so as not to allow it to be removed from the reel until the fisherman either releases the gripping means or casts his line, and thus the disclosed devices are not structurally germane to the invention.

The fishing line tensioning device of this invention overcomes the deficiencies of the devices disclosed in the prior art patents by providing a gentle snubbing action to alleviate the problem of snags and tangles forming in fishing line as it is wound onto the reel. This difficulty, known by generations of fishermen, can ultimately lead to the formation of knots and tangles in the line on the spool of the reel which could necessitate the application of a great amount of time and effort in unravelling. Even worse, if the fishing line were so badly entangled that the fisherman's efforts were futile, it might become necessary to cut the tangled line from the reel. The problem of knots and tangles results in an unnecessary waste of the fisherman's time and, in some cases, money which can be avoided through the use of the device of the present invention.

In light of the above, an object of the invention is to provide a simple and reliable fishing line tensioning device.

It is another object of the invention to alleviate the problem of loops forming when the fishing line is wound onto the spool of the reel and the resultant snags and tangles in the fishing line which impair casting by the fisherman.

It is a further object of the invention to provide a device adapted to be mounted on a fishing rod for tensioning the fishing line which, when the fishing line is jerked or tugged, will free the fishing line from the snubbing action previously imparted thereto.

Some of the objects and advantages of the invention having been stated, other objects will become evident as the description proceeds, when taken in connection with the accompanying drawings, in which:

FIG. 1 is a perspective view of a fishing rod and reel with the device of this invention mounted thereon;

FIG. 2 is a perspective view of the invention with the elements thereof in an exploded relationship;

FIG. 3 is a transverse sectional view taken along line 3—3 of FIG. 1;

FIG. 4 is an enlarged sectional view taken along line 4—4 of FIG. 3; and

FIG. 5 is an inverted view of the body of FIG. 2.

Referring now more specifically to the drawings, FIG. 1 shows the tensioning device of the present invention, broadly indicated at 10, in combination with a fishing rod 11 and reel 12. Fishing line 14 extends from the reel 12 through the tensioning device 10 and through the next adjacent guide eyes 15a–15n which are secured to the rod 11. Therefore, it can be clearly understood that the tensioning device 10 is mounted on the fishing rod 11 between the reel 12 and the guide eyes 15a–15n and is intended to impart a snubbing action to the fishing line as it is being wound onto the reel 12 by the fisherman.

The details of the tensioning device are illustrated in greater detail in the remaining figures, namely FIGS. 2–5. It will be observed in these views that the tensioning device 10 essentially comprises a body, generally indicated at 16, which has a peripheral recess 18 located therein; means, generally indicated at 19, for securing the body 16 to the fishing rod 11; and snubbing means, generally indicated at 20, carried by the body 16 and having a resilient portion thereof extending within the peripheral recess 18.

For adaptation to the fishing rod 11, the body 16 is bifurcated and comprises a pair of legs 21a, 21b having corresponding ends spaced apart from each other and having their other ends interconnected for initially receiving the fishing rod 11 therebetween and guiding it towards the interconnected ends 22 for a mounting engagement therewith. As illustrated, the securing means 19 comprises a bolt 24, extending through the legs 21a, 21b remote from the interconnected ends 22, and a nut 25 on one end of the bolt 24 for securing the body 16 to the fishing rod 11 in such a manner that a central axis defined by said body is in a predetermined orientation, co-directional and substantially co-axial with the longitudinal axis of the fishing rod 11.

As can be best understood from FIGS. 1 and 3, the peripheral recess 18 extends transversely of and partially encircles the longitudinal axis of the fishing rod 11. The snubbing means 20 rests in part within the peripheral recess 18 so that the fishing line 14, when it is positioned between the snubbing means and the body 16, will have a snubbing action imparted thereto for tensioning the fishing line as it is being wound upon the spool of the reel 12.

As best shown in FIGS. 2–4, the snubbing means 20 comprises a resilient wire 26 residing at least in part in the peripheral recess 18 and which is fastened at one end 26a between the nut 25 and the body 16. The snubbing means further comprises a coil 28 formed in the resilient wire 26 adjacent the end 26a thereof secured to the body 16. The coil 28 flexes and allows for momentary positioning of the wire 26 outwardly from the body 16 (phantom lines in FIG. 3) when a sudden force is applied to the fishing line, typically occurring when a fish takes the lure or bait on the end of the line, which movement frees the line 14 from the snubbing action imparted thereto by the resilient wire 26.

It can be further seen that the body 16 has an opening therethrough, formed in part by the interconnected ends 22, and that the peripheral recess 18 and the resilient wire 26 extend transversely of and partially encircle the opening in the body 16 through which the fishing rod 11 (phantom lines in FIG. 3) is received. Consequently, the longitudinal axis of the fishing line 14 is aligned substantially perpendicular to the peripheral recess 18 and the resilient wire 26 so as to facilitate the snubbing action imparted to the fishing line 14 passing therebetween.

It is contemplated that in normal operation the fisherman would position the fishing line 14 between the resilient wire 26 and the body 16 after casting so that as he began to wind in the line it would be snubbed by the tensioning device 10. As will be apparent, snubbing will be effected (FIG. 4) to line 14 by the frictional resistance imparted to the line as it passes between the body 16 and the resilient wire 26 and through the peripheral recess 18. If a fish should suddenly take the lure or bait and a jerking or tugging action was thereby imparted to the fishing line 14, the force on the fishing line 14 would cause the resilient wire 26 to move outwardly from the body 16 and out of the peripheral recess 18 so as to free the fishing line. Therefore, it is apparent that the fish line tensioning device of the present invention will not contribute to the breaking of the line 14 when the line is positioned within the tensioning device and a fish suddenly takes the bait. Furthermore, this function of the tensioning device of this invention is automatic and does not require any affirmative action or reaction by the fisherman to free the line.

It will thus be seen that the invention provides a fishing line tensioning device which can be readily mounted on a fishing rod and reel so as to tension fishing line when it is being wound onto the reel and to alleviate problems known heretofore of loops, snags and tangles being formed in the fishing line so as to hinder casting.

In the drawings and specification there has been set forth a preferred embodiment of the invention and, although specific terms are employed, they are used in a generic and descriptive sense only and not for purposes of limitation.

That which is claimed is:

1. A device for mounting on a fishing rod to tension fishing line as the line is being wound on a reel, said device comprising:

a body having an opening therethrough for receiving a fishing rod, said body having a peripheral recess extending transversely of and partially encircling said opening;

means for securing said body to a fishing rod; and a resilient wire fastened at one end thereof to said body and at least in part extending within the peripheral recess, said wire having a coil formed therein adjacent said end allowing for a flexing of the wire outwardly from said body, whereby a fishing line positioned between said resilient wire and said body will have a snubbing action imparted thereto to provide tension to the fishing line as the same is being wound upon a reel and a sudden force applied to the fishing line will free it from the snubbing action.

2. A device as claimed in claim 1, wherein said body comprises a pair of legs having corresponding ends spaced apart from each other and having their other ends interconnected for initially receiving a fishing rod between said legs and guiding same towards the interconnected ends thereof for engagement therewith, and wherein said means for securing said body to a fishing rod comprises a bolt and cooperating nut, said bolt extending through said legs remote from the interconnected ends thereof, and said resilient wire being secured to said body by said bolt and nut.

* * * * *